Jan. 12, 1971  B. S. MITCHELL, SR  3,555,417
APPARATUS FOR INDICATING PHASE SEQUENCE
Filed Sept. 23, 1968

Inventor
Benedict S. Mitchell, Sr.
By *John J. Tomacik*
Attorney

United States Patent Office 3,555,417
Patented Jan. 12, 1971

3,555,417
APPARATUS FOR INDICATING
PHASE SEQUENCE
Benedict S. Mitchell, Sr., 2059 N. Mozart St.,
Chicago, Ill. 60647
Filed Sept. 23, 1968, Ser. No. 761,524
Int. Cl. G01r 25/00
U.S. Cl. 324—86                                                10 Claims

ABSTRACT OF THE DISCLOSURE

An electrical apparatus in the form of an electrical instrument for identifying and indicating phase sequence of a three phase system having substantially equal phase-to-phase voltages at 120° space relation to each other, the instrument comprising a direct current meter with a zero center scale to register current flow in either direction therethrough, and a voltage dividing electrical circuit having a phase shifting portion and a rectifying portion with said meter connected therebetween, wherein when the circuit is selectively connected to the three phase system the meter will deflect in a predetermined direction to indicate phase sequence of the system, and where one phase can be identified the instrument is operative to identify that phase and thereinafter identify the remaining phases of the system.

BACKGROUND OF THE INVENTION

It is commonly known that three phase alternating current systems are almost exclusively used to serve industrial and commercial installations. Three phase systems may have various differences such as a high phase, i.e., one phase having a higher potential to ground than the others, or others may have one of the phases grounded thereby relating the remaining phases to ground. All commonly used three phase systems however have, at least, two common characteristics. One is that the phase to phase voltages are substantially the same and secondly the phase voltages are arranged at substantially 120 degrees space relation to each other thus producing a phase sequence within the system.

The determination of phase sequence and the indication of the phases themselves are extremely important in the electrical industry. For example, it is well known that the direction of rotation of a three phase motor is determined by the phase sequence of the voltage applied across the motor, and that if the phase sequence is reversed the direction of rotation is correspondingly reversed. This matter is of prime importance when the motor is a driving apparatus that only can be driven in one direction and reversal would cause severe damage. In situations such as these the need to predetermine phase sequence before motor energization is mandatory.

The need of phase indication is especially important where single phase equipment is connected to three phase systems; for only where the phases of the system can be identified can such loads be selectively connected to effect a substantially balanced total load to the system to thus take full advantage of the full capacity of the power system.

Heretofore, various devices which have been used to either indicate phase sequence or the phase themselves are either extremely complex, or require the need of multiple devices, or require an operator to be experienced to interpret and determine relative brightness of lamps during testing.

One object of this invention is to provide a novel electrical instrument which will indicate phase sequence of a three phase system.

Another object of the invention is to provide a method for identifying a phase having unique potential characteristics relative to a reference electrode exclusive of the remaining phases wherein all phases can be indicated.

A still further object is to provide a rugged and easily portable instrument which is quickly and easily connected to a power system.

A still further object of the invention is to provide an instrument which will visually indicate a deflection relative to the rotation of a three phase motor and similarly driven apparatus.

A more specific object of the invention is to devise a circuit having a voltage dividing rectifying portion connected across two of the phases and a voltage dividing phase shifting portion connected to all three phases, and means sensing relative potential differences between a predetermined point of each portion.

These and other objects and advantages inherent in and encompassed by the invention will become more apparent from the specification and the drawings, wherein.

DESCRIPTION OF THE PREFERRED EMBODIMENT

Figure 1:
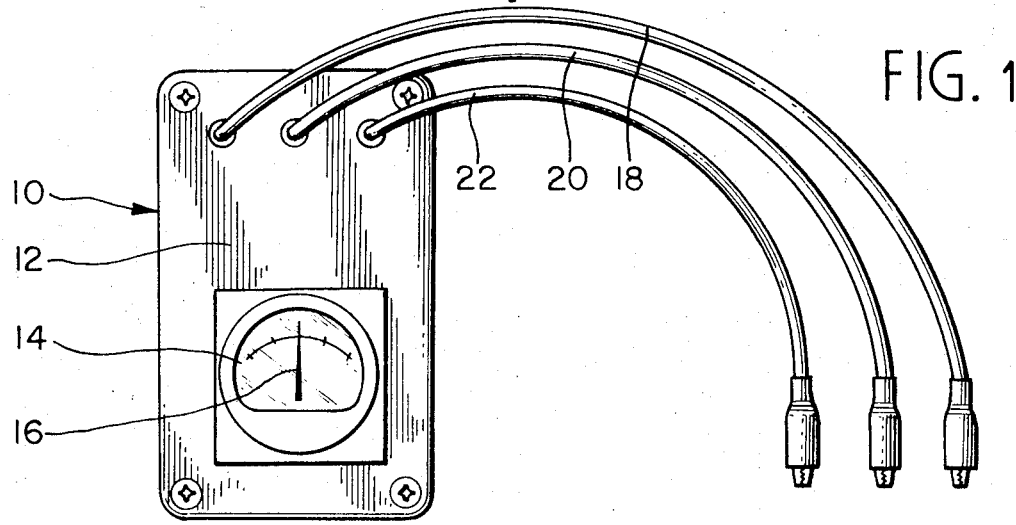
FIG. 1 is a pictorial view of the instrument incorporating the invention.

Attention is invited to FIG. 1 where the instant invention namely, a phase sequence indicator is shown as a field-going instrument generally designated 10. The instrument necessarily comprises a case 12 which holds a direct-current micro ammeter 14 having a center zero indicator 16 which will deflect from the center zero position in either the right or left direction in response to a corresponding direction of current flow through the meter. Above the meter are placed three connecting leads generally designated 18, 20 and 22, respectively, which pass through the case 12 and are connected to a circuit generally designated 24 enclosed within the dashed lines of FIG. 2. Each lead comprises a flexible insulated wire having insulation capable of protecting the user from electrical potentials up to 600 volts. Connected to the free end of each lead is an electrical quick-connect device such as an alligator clip which is also protectively insulated as hereinbefore described. It is recommended that the insulators covering each alligator clip be of a different color to facilitate identification of the leads and proper circuit connection to the three phase system to be tested.

Figure 2:
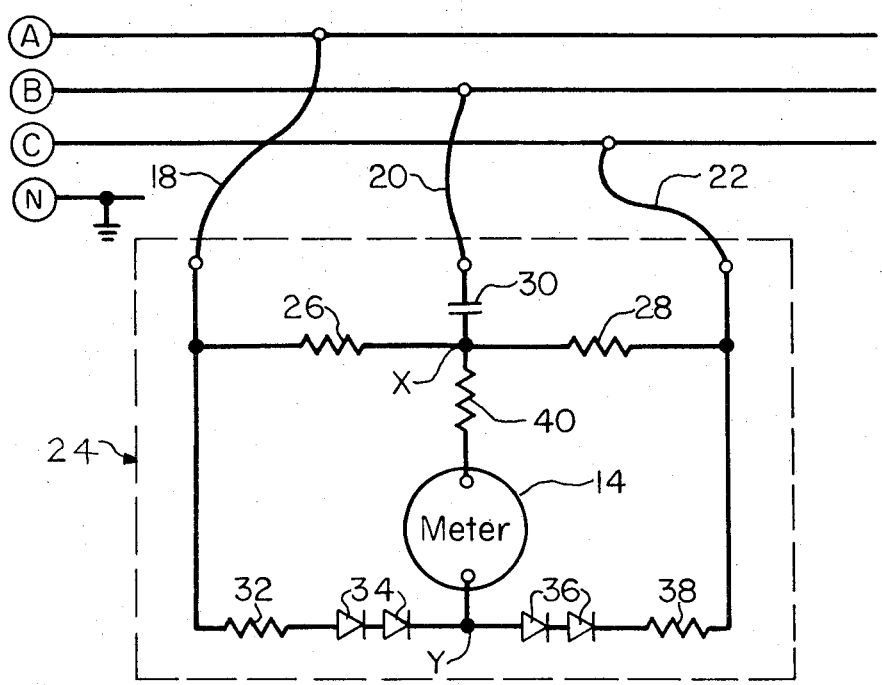
FIG. 2 is a circuit diagram of the instant invention as applied to a three phase power system.
Figure 3:
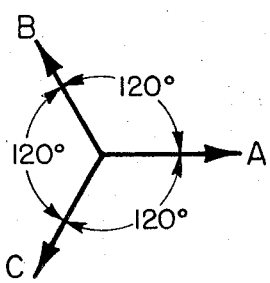
FIG. 3 is a vector diagram representing the relationship of the voltages of a typical three phase system.

Now referring to FIG. 2 the circuit 24 is shown electrically connected to a typical three-phase alternating current power system having substantially equal phase-to-phase voltages which are displaced essentially 120 degrees in space relation to each other defining a system wherein the vector summation of the phase-to-phase voltages is substantially equal to zero as represented in FIG. 3. The three phase power system is represented as three lines, each representing a particular phase and designated by the letters A, B and C which represent A phase, B phase and C phase, respectively.

It can be seen that the lead 18 connects the circuit 24 to A phase and the leads 20 and 22 connect the circuit 24 to B phase and C phase, respectively. It should be noted that this particular connection is shown merely for illustration and explanation of the instruments operation and that the leads are capable of connection to the system in any of six combinations.

Now referring more particularly to the circuit 24 which has a bridgelike construction featuring a phase shifting portion which acts as a voltage divider having a medial junction designated X. The circuit 24 also has a rectifying portion which acts as a voltage divider having a medial junction designated Y. Connected between junctions X and Y is a current limiting circuit incorporating the meter 14.

The phase shifting portion of circuit 24 comprises a resistor 26 connected between the lead 18 and junction X, and a resistor 28 connected between the lead 22 and junction X. A capacitor 30 having a capacitive reactance substantially equal in value to the resistors 26 and 28 which in turn have substantially the same value. It can be seen that the phase shifting portion is connected to all three phases of the power system through the leads 18, 20 and 22.

The rectifying portion of circuit 24 comprises a resistor 32 connected to a rectifying element such as a diode 34. The resistor 32 and diode 34 are in turn connected between the lead 18 and the junction Y. It should be noted that the rectifying element 34 is so arranged that current can flow only in the direction from the lead 18 to the junction Y. The other part of the rectifying portion comprises a resistor 36 having a value substantially the same as resistor 32 connected to a rectifying element such as a diode 38 wherein the resistor 36 and rectifying element 38 are connected between the junction Y and the lead 22 with the rectifying element arranged to allow current to flow only from junction Y to the lead 22.

The microammeter 14 is connected between the junctions X and Y through a current limiting resistor 40 and is operative to indicate the direction of current flow therebetween.

When the instant invention is connected across a three phase system as shown in FIG. 2 the indicator 16 will deflect to the right in response to A–B–C phase arrangement vectorially illustrated in FIG. 3; thus indicating one of the two possible phase sequences of the system, that is a forward sequence where A phase leads B phase which in turn leads C phase. The forward phase sequence will also be manifest when leads 18, 20 and 22 are connected in a B–C–A or C–A–B arrangement respectively resulting in a corresponding meter deflection to the right. It should be obvious that meter reconnection is not necessary if the phase lines themselves are reconnected in different arrangements.

In like manner the indicator 16 will deflect to the left when the reverse sequence is sensed by instant invention. This occurs when the leads 18, 20 and 22 are connected respectively to phase arrangements C–B–A, A–C–B or B–A–C. Therefore, if one knows the direction of rotation of a three-phase motor for a certain connection of instant invention, he can predict the direction of rotation, regardless of a transposition of the phases, by merely observing the direction of deflection of indicator 16.

The instant invention may also be used as a phase indicator where one of the lines is identifiable and is functional to identify that phase when it has a potential characteristic substantially different from the other phases. In practical considerations this characteristic is manifested as one of the phases being grounded or one phase having a higher potential to a reference, such as a grounded neutral illustrated as N in FIG. 2. Since the instant invention through the use of leads 18 and 20 or 20 and 22 as voltage probes will have a magnitude of deflection which corresponds to the magnitude of potential difference impressed across the selected leads it can be easily seen how the instant invention can be used to identify an identifiable phase and knowning this enabling the operator thereafter to identify each and every phase of a particular system regardless where the testing happens to take place. The instant invention herein described has been constructed into a field-going instrument for use on typical utility three phase power systems having phase-to-phase voltages up to 480 volts. As hereinbefore described the leads 18, 20 and 22 and associated quick-attach devices are properly insulated to protect the user from the hazard of electrical shock. Within the instrument, the circuit components have been chosen as follows: elements 26, 28, 32 and 38 are each 56K (thousand) ohms carbon type resistors, element 40 is 150K carbon type resistor and the reactor is a 0.047 microfarad capacitor rated to operate at 600 volts and has an impedance of approximately 56K ohms at the standard power frequency of 60 cycles per second; the rectifying elements 34 and 36 each comprise two series connect 300-volt rectifying diodes to insure an adequate peak inverse voltage rating; the microammeter is a direct current meter having 500–0–500 micro-amp. zero center scale. An instrument embodying the above components has been found to perform satisfactorily on typical utility company power systems.

It must be realized that other components having different values incorporating various means for indicating current direction could be used in a circuit as heretofore described within essence of the inventive concept of the instant invention. It is therefore apparent that various modifications and changes may be made therein without departing from the scope of the appended claims.

What I claim is:

1. An electrical phase sequence indicator comprising; means for selectively coupling said indicator to an electrical source, said means including first, second and third voltage terminals in selective relation to said source, a phase shifting portion including a unidirectional current voltage divider coupled between said first and third terminals, and a phase shifting element coupled to said second terminal and voltage divider to substantially shift the phase relation of the voltage thereon in relation to a first intermediate junction of said unidirectional current voltage divider having at least two intermediate rectifying elements to rectify the current therethrough, said rectifying portion coupled between said first and third terminals; indicating means coupled to said intermediate junction and a second junction between said rectifying elements to indicate a potential difference therebetween thereby indicating the phase sequence of said electrical source.

2. The invention according to claim 1 wherein said phase shifting portion comprising a first resistor, a reactor and a second resistor, each having one end connected to said first, second and third terminals respectively and each having their other ends commonly connected to form said first intermediate junction, and said rectifying portion comprising a first part having a series connected resistor and rectifying element, a second part having a series connected resistor and rectifying element, said first and second parts each having one end connected to the first and third terminals respectively and each having their other ends commonly connected to form said second junction.

3. The invention according to claim 2 wherein said first resistor, reactor and second resistor of said phase shifting portion each have impedance values substantially equal to each other.

4. The invention according to claim 3 where said resistor of said first part and said resistor of said second part have substantially the same resistance.

5. The invention according to claim 3 wherein said reactor comprises a capacitor having a reactance substantially equal in value to said first and second resistor of said phase shifting portion.

6. The invention according to claim 2 wherein the reactor and first and second resistor of the phase shifting portion, and the resistors of the first and second parts of the rectifying portion all have impedance values substantially equal to each other.

7. The invention according to claim 6 wherein said reactor is a capacitor having a reactance substantially equal to said first and second resistor of the phase shifting portion.

8. The invention according to claim 7 and said indicating means comprising bidirectional voltmeter connected between said first and second junctions.

9. The invention according to claim 7 and said indicating means comprising a series connected current limiting resistor and bidirectional ammeter connected to said first and second junctions.

10. The invention according to claim 7 wherein said rectifying elements are arranged to allow a substantially unidirectional current flow from said first to said third terminals.

References Cited

J. E. Parton: J. Sci. Instrum., pp. 375–378, vol. 30 October 1953.

ALFRED E. SMITH, Primary Examiner

U.S. Cl. X.R.

307—127; 317—47